US007788787B2

(12) United States Patent
Shelton et al.

(10) Patent No.: US 7,788,787 B2
(45) Date of Patent: Sep. 7, 2010

(54) METHOD OF MAKING DEBRIS-FREE PLASTIC COLLATING STRIP FOR NAILS

(75) Inventors: Lawrence S. Shelton, Morton Grove, IL (US); Paul J. Storiz, Grayslake, IL (US); Michael Starozhitzky, Long Grove, IL (US); Algis P. Suopys, Lindenhurst, IL (US); Donald E. Bergstrom, Lake Villa, IL (US)

(73) Assignee: Illinois Tool Works Inc., Glenview, IL (US)

( * ) Notice: Subject to any disclaimer, the term of this patent is extended or adjusted under 35 U.S.C. 154(b) by 207 days.

(21) Appl. No.: 12/176,722

(22) Filed: Jul. 21, 2008

(65) Prior Publication Data

US 2008/0282529 A1 Nov. 20, 2008

Related U.S. Application Data

(62) Division of application No. 11/383,032, filed on May 12, 2006.

(51) Int. Cl.
*B22D 11/128* (2006.01)

(52) U.S. Cl. .......... 29/527.2

(58) Field of Classification Search .......... 29/460, 29/467, 759, 458, 527.2, 527.1; 411/442, 411/444, 966, 443; 206/344, 338, 813; 227/136
See application file for complete search history.

(56) References Cited

U.S. PATENT DOCUMENTS 1,792,235 A 2/1931 Maynard
2,991,477 A 7/1961 Hoyle, Jr. et al.
3,082,425 A 3/1963 Leslie
3,212,632 A 10/1965 Baum et al.
3,303,632 A 2/1967 Halstead
3,315,436 A 4/1967 Baum et al.
3,342,659 A 9/1967 Baum et al.
3,348,669 A 10/1967 Powers (Continued)

FOREIGN PATENT DOCUMENTS

GB 1282359 7/1972

(Continued)

OTHER PUBLICATIONS

International Search Report for PCT/US2007/011356.

(Continued)

*Primary Examiner*—John C Hong
(74) *Attorney, Agent, or Firm*—Levenfeld Pearlstein, LLC

(57) ABSTRACT

A fastener assembly is configured for use in an associated fastener driving tool for driving a fastener from the assembly into an associated substrate. The assembly includes a row of fasteners, each having a shank, arranged substantially parallel to each other. A collation system is formed from a plastic material that is molded onto and adhered to the fasteners. The plastic material is molded to define a collar portion substantially encircling the fastener shank and a connecting portion extending between and connecting adjacent collar potions. The plastic material is formulated from an adhesive polymer. When the fastener is driven from the driving tool, the collar portion remains adhered to the fastener such that the collar portion penetrates the substrate with the fastener.

16 Claims, 3 Drawing Sheets

A14
10
12
3
3
A10
α
2
18
30
16
2
20
12a
14
32
12b
34

U.S. PATENT DOCUMENTS 3,357,761 A 12/1967 Langas et al.
3,358,822 A 12/1967 O'Connor
3,432,985 A 3/1969 Halstead
3,463,304 A 8/1969 Gallee et al.
3,471,008 A 10/1969 Reich et al.
3,491,389 A 1/1970 Leistner
3,592,339 A 7/1971 Briggs, Jr.
3,616,083 A 10/1971 Mohr
3,625,352 A 12/1971 Perkins
3,729,885 A 5/1973 Mosetich et al.
3,736,198 A 5/1973 Leistner
3,756,391 A 9/1973 Keck et al.
3,813,985 A 6/1974 Perkins
3,828,924 A 8/1974 Perkins
3,861,527 A 1/1975 Perkins
3,862,685 A 1/1975 Mosetich et al.
3,878,663 A 4/1975 Shelton
3,889,450 A 6/1975 Danielson et al.
3,904,032 A 9/1975 Maier
3,944,068 A 3/1976 Maier et al.
3,966,042 A 6/1976 Shelton et al.
3,967,727 A 7/1976 Jakesch
3,992,852 A 11/1976 Schwarz et al.
4,162,728 A 7/1979 Uzumcu et al.
4,167,229 A 9/1979 Keusch et al.
4,250,996 A 2/1981 Bartz
4,298,121 A 11/1981 Oide et al.
4,343,579 A * 8/1982 Shelton et al. .............. 411/442
4,370,082 A 1/1983 Sundberg
4,383,608 A 5/1983 Potucek
4,679,975 A 7/1987 Leistner
4,711,980 A 12/1987 Leistner
4,804,088 A 2/1989 MacDonald
4,805,687 A 2/1989 Gall
4,836,372 A 6/1989 Shelton
4,867,366 A 9/1989 Kleinholz
4,881,643 A 11/1989 Pfister
4,932,821 A 6/1990 Steffen et al.
4,971,503 A 11/1990 Barnell et al.
5,005,699 A 4/1991 Kawashima et al.
5,058,228 A 10/1991 Wright et al.
5,140,715 A 8/1992 Moracelli
5,149,237 A 9/1992 Gabriel et al.
5,441,373 A 8/1995 Kish et al.
5,443,345 A 8/1995 Gupta
5,509,768 A 4/1996 Hon
5,522,687 A 6/1996 Chen
5,609,712 A 3/1997 Takumi
5,713,709 A 2/1998 Huang
5,733,085 A 3/1998 Shida et al.
5,795,121 A 8/1998 Tucker et al.
5,836,732 A 11/1998 Gupta et al.
5,865,311 A 2/1999 Hentges et al.
5,931,298 A 8/1999 Huang
5,931,622 A 8/1999 Gupta et al.
6,044,972 A 4/2000 Rohrmoser et al.
6,082,536 A 7/2000 Ito et al.
6,086,304 A 7/2000 Hujishima et al.
6,394,268 B1 5/2002 Dill et al.
6,524,387 B2 2/2003 Arslanouk et al.
6,705,464 B1 3/2004 Yang
6,708,821 B2 3/2004 Tucker et al.
6,758,018 B2 7/2004 Sutt, Jr.
6,779,959 B1 8/2004 Yang
6,823,990 B2 11/2004 Gaudron
6,880,700 B2 4/2005 Osuga et al.
6,880,723 B2 4/2005 Osuga et al.
D541,125 S 4/2007 Gaudron
7,556,138 B2 7/2009 Kim
2004/0118720 A1 6/2004 Powers et al.
2005/0031436 A1 2/2005 Yoshisawa et al.
2007/0237607 A1* 10/2007 Lat ........................... 411/442
2007/0264103 A1 11/2007 Shelton et al.
2008/0131232 A1 6/2008 Heskel et al.
2008/0282529 A1 11/2008 Shelton et al.
2008/0317563 A1 12/2008 Shida et al.

FOREIGN PATENT DOCUMENTS

WO WO 97/42421 11/1997
WO WO2007133663 11/2007
WO 2008001790 A1 1/2008

OTHER PUBLICATIONS

Stanley Bostitch Sheather Plus specification sheet, The Stanley Works 2002.

* cited by examiner

A14
10
12
3
3
18
A10
α
2
30
2
16
20
12a
14
32
12b
34

METHOD OF MAKING DEBRIS-FREE PLASTIC COLLATING STRIP FOR NAILS

BACKGROUND OF THE INVENTION

The present invention pertains to collated fasteners. More particularly, the present invention pertains to a collated nail strip formed with a debris-free plastic material for use in a fastener driving tool.

Fast-acting fastener driving tools are in widespread use in the construction industry. For use in these tools, the nails are assembled in strips that are inserted into a magazine of the tool. The strips are flat and the nails or other fasteners are held parallel to one another. The nails are assembled in a staggered or stepped manner such that the major axis of the nail forms an angle to the longitudinal direction of the strip. In presently known collated nails, the angle is about 0 degrees to 40 degrees and preferably between 15 degrees and 35 degrees. An in-depth discussion of such fasteners is provided in U.S. Pat. No. 5,733,085, to Shida, which is incorporated herein by reference.

Presently known collated nails are assembled using tape strips or an extruded plastic material. The plastic (or polymer) in the plastic-formed strips is cooled and hardens to hold the nails in the strip form for use in the tool. The tape strips are formed from a kraft paper or other paperboard material having a plastic (polymer) adhesive on a surface thereof that is heated on contact with hot nails and, as it cools, adheres to the nails.

Although tape strips have the advantage of minimizing the debris that is formed as the tool is actuated and the nails are driven into the material (typically wood) to be fastened, the plastic strips provide ease of manufacture, especially for larger spaced nails. No materials, other than the nails and the plastic collating material are needed.

However, it has been noted that as the plastic collated nails are driven into the workpiece, the plastic material shatters and separates from the nail shank. This can create loose debris at the worksite which can result in housekeeping problems.

Accordingly, there is a need for a plastic collation system for strip-formed fasteners that reduces the tendency for the plastic to generate debris as the nail is driven into the workpiece. Desirably, the collation system reduces the tendency for the nail strip to corrugate or advance on itself in the tool magazine. More desirably, such a system minimizes the amount that the strip can flex, and maximizes the adhesion of the plastic to the nail shanks.

BRIEF SUMMARY OF THE INVENTION

A fastener assembly is for use in an associated fastener driving tool for driving a fastener from the assembly into an associated substrate, such as a wood substrate. The fastener assembly includes a row of fasteners arranged substantially parallel to each other. Each fastener has a shank.

A collation system is formed from a plastic material that is molded onto and adhered to the fasteners. The plastic material defines a collar portion that captures or at least substantially encircles the fastener shank and a connecting portion extending between and connecting adjacent collar portions. The plastic material is formulated from an adhesive polymer such as a polyolefin, a polyolefin blend, an epoxy or the like. When the fastener is driven from the driving tool, the collar portion remains adhered to the fastener such that the collar portion penetrates the substrate with the fastener.

In a present strip, the polymer is a blend of polypropylene and a maleic anhydride modified polypropylene and adhesion is effected by preheating the fasteners prior to molding the plastic material to the fasteners. A preferred preheating temperature is about 450° F. and preferably about 450° F. to 600° F.

In the strip, the fasteners are parallel to one another and at an angle relative to an axis of a selected one of the fasteners.

The connecting portion can be formed as a bridge and a rib in which the bridge and rib have a generally cruciform shape. The rib can be formed at an angle equal to the angle of the fasteners relative to the axis of the selected one of the fasteners. Alternately, the rib can be formed at an angle that is not equal to that of the fasteners relative to the axis of the axis of the selected one of the fasteners. Alternately still, the connecting portion has an embossed pattern formed therein.

In a present strip, the collation system includes upper and lower plastic moldings adhered to the fasteners. The upper and lower plastic moldings are formed parallel to one another, with the upper molding formed nearer to the head of the fastener and the lower molding formed nearer to the tip of the fastener. The lower molding is formed on the shank of the fastener within the lower half and preferably within about ½ inch of the tip of the fastener. The plastic molding can be formed having a taper to facilitate penetration into the substrate.

A method for making a fastener assembly includes the steps of arranging a plurality of fasteners in a row parallel to one another, preheating the plurality of fasteners to elevate the temperature of the fasteners, molding a polymer material onto the preheated fasteners and between adjacent fasteners to form a plastic collation having a collar that captures or at least substantially encircles a shank of each fastener and a connecting portion between adjacent fasteners and cooling the strip to form the fastener assembly. The strip can then be post heat treated.

These and other features and advantages of the present invention will be apparent from the following detailed description, in conjunction with the appended claims.

BRIEF DESCRIPTION OF THE SEVERAL VIEWS OF THE DRAWINGS

The benefits and advantages of the present invention will become more readily apparent to those of ordinary skill in the relevant art after reviewing the following detailed description and accompanying drawings, wherein:

FIGS. 6 and 6A illustrate an alternate bridge portion that is embossed, in which FIG. 6A is a cross-section taken along line 6A-6A of FIG. 6.

DETAILED DESCRIPTION OF THE INVENTION

Figure 1:
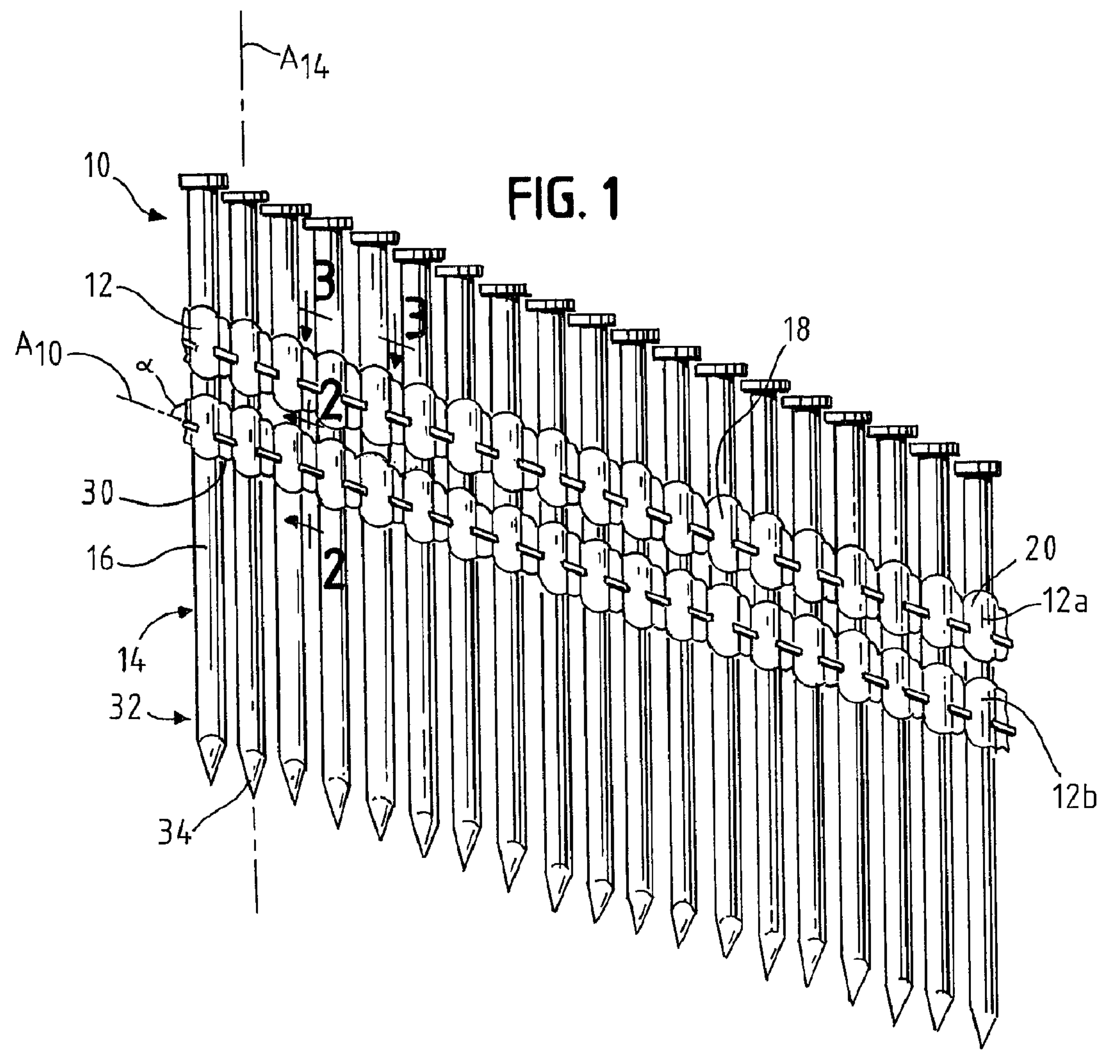
FIG. 1 is a plan view of one embodiment of a nail strip or collation having a pair of plastic molded carrier strips.

While the present invention is susceptible of embodiment in various forms, there is shows in the drawings and will hereinafter be described a presently preferred embodiment with the understanding that the present disclosure is to be considered an exemplification of the invention and is not intended to limit the invention to the specific embodiment illustrated.

It should be further understood that the title of this section of this specification, namely, "Detailed Description Of The Invention", relates to a requirement of the United States Patent Office, and does not imply, nor should be inferred to limit the subject matter disclosed herein.

Referring now to the figures and in particular to FIG. 1 there is shown a nail strip 10 having a plastic collation system 12 embodying the principles of the present invention. In the illustrated strip 10, the nails 14 are positioned at an angle a of about 20 degrees to the transverse direction of the strip 10; however, other angles a (including zero degrees) are contemplated for use with the present invention.

As will be appreciated by those skilled in the art, the illustrated nails 14 are full head nails, rather than D-head (or clipped head) nails. Accordingly, the nails 14 provide increased holding characteristics (due to the increased surface area of the nail head H). However, it will also be appreciated that using full head H nails 14 requires that the strip 10 is fabricated with a slightly greater distance $d_{14}$ between the (axes $A_{14}$ of the) nails 14 to accommodate the larger nail heads H.

The nails 14 are collated and held to one another by the plastic collation 12. The plastic collation 12 is molded to, over and around the shanks 16 of the nails 14, and connects each nail 14 to its adjacent nail or nails (that is, extends between the nails 14). The collation 12 is formed as a contiguous molding (as indicated generally at 18) around and between the nails 14; nevertheless, for purposes of this disclosure, the molding 18 is viewed as having a collar portion 20, which is that portion that encircles the nail shank 16, and a connecting portion 22, which is that portion that extends between and connects adjacent collar portions 20. In the nail strip 10 illustrated in FIG. 1, two plastic moldings or collations are shown, namely an upper molding or collation 12*a* and a lower molding or collation 12*b*, that are formed with structure similar to one another. The following disclosure is applicable for both of the moldings and are referred to collectively as molding or collation 12.

The present nail collation 12 differs from previously known plastic collations in a number of important aspects. First, rather than the plastic merely encircling and extending around and between the nails, the present collation uses a material that is molded and adheres to the nails 14. It has been found that plastic that is adhered to the nails, rather than merely molded around the nails is advantageous in that the plastic material tends to remain on the nail shank 16 during driving. That is, the collation 12 material is maintained on the shank 16 as the nail 14 penetrates the substrate and thus enters the substrate with the nail 14. Advantageously, much less debris is generated during driving of a nail 14 from the present nail strip 10 compared to prior known nail strips.

It will also be appreciated that the adhesion of the plastic material to the nails 14 also has benefits vis-à-vis the rigidity of the nail strip 10. That is, when the plastic merely encircles the nail shanks, the plastic can slip around the nail shanks. On the other hand, by adhering the plastic molding 12 to the shanks 16, the nail strip 10 tends to become more rigid and is less likely to flex and to corrugate.

The material is an adhesive polymer, an epoxy or the like. The material can be, for example, an adhesive polyolefin such as a maleic anhydride modified polyolefin, such as polypropylene, polyethylene or the like. The material can include a blend of a polyolefin and a modified polyolefin, such as a blend of polypropylene and a maleic anhydride modified polypropylene. One or more other resins can also be used, such as a polyvinyl alcohol (PVA) based material, an ethylene vinyl alcohol (EVA) based material, an acrylonitrile butadiene styrene (ABS) based material, ionomers, methyl methacrylates and the like. Fillers can also be used as can blends of any of the materials, as suitable. Other materials will be recognized by those skilled in the art and are within the scope and spirit of the present invention.

A present plastic composition is a polypropylene resin that has been modified to enhance adhesion to surfaces, including metal surfaces. A preferred resin is a maleic anhydride modified polypropylene commercially available from Mitsui Chemicals America, Inc, of Rye Brook, N.Y., under the tradename ADMER® QF5512A.

It has been found that unexpectedly high levels of adhesion were achieved using these modified resins when the resins were applied to nails 14 that were heated to elevated temperatures prior to application of the polymer (resin). Samples of nails were prepared by preheating the nails to a temperature of about 450° F. to about 600° F., and preferably about 500° F. to 550° F. and molding the maleic anhydride modified polypropylene to the nails. These were tested against other molded nail strip compositions, in which the molding was carried out with the nails at ambient temperature and with the nails at elevated temperatures (shown as Cold and Hot under column listed as Nail Temp). Tests were also carried out with strips that were postmolding heat treated (shown in columns identified as As Extruded and After 30 Min. Bake). That is, after the plastic material has been molded to the nails, the nail strip was heated for a period of time (30 minutes) at a predetermined temperature. The results of the testing are shown in Table 1, below.

TABLE 1

PLASTIC ADHESION SHEAR STRENGTH OF VARIOUS PLASTIC NAIL COLLATIONS

| | | | Plastic Adhesion Shear Strength (lbs) | | |
|---|---|---|---|---|---|
| Polymer Composition | Material Tested | Nail Temp | As Extruded | After 30 Min. Bake | Bake Temp (° F.) |
| Polypropylene (PP) | Current material | Cold | 6.0 | 17.4 | 375 |
| Modified PP-anhydride | Amplify GR 205 | Cold | 6.5 | 48.4 | 300 |
| | | Cold | 6.5 | 44.4 | 350 |
| Modified PP-anhydride | Amplify GR | Cold | 0.0 | 39.9 | 300 |
| HDPE/anhydride blend | MSI | Cold | 5.3 | 3.6 | 250 |
| | | Cold | 5.3 | 90.9 | 350 |
| | | Hot | 64.0 | 86.5 | 350 |
| Modified PE-anhydride | Bynel | Cold | 6.7 | 5.9 | 250 |
| | | Cold | 6.7 | 49.4 | 350 |
| 12% vinyl acetate copolymer | Elvax | Cold | 4.5 | 12.0 | 225 |
| | | Cold | 4.5 | 15.9 | 350 |
| EMMA Copolymer (Zn) | Suryin 9150 | Warm | 0.0 | 51.2 | 375 |
| Modified PP-anhydride | Tymor CP97X110 | Cold | 8.4 | 15.6 | 350 |
| | | Cold | 8.4 | 88.0 | 375 |
| Modified PP-anhydride | Admer QF551A | Cold | 4.6 | 17.1 | 300 |
| | | Cold | 4.6 | 28.0 | 350 |
| | | Hot | 71.0 | 210.4 | 350 |
| Blend | 75% Current PP | Cold | 7.0 | 7.3 | 350 |

In Table 1, the plastic adhesion shear strength (in pounds, lbs.) was measured using a tensile testing device, by forcing the nails through a precisely sized hole in a direction parallel to the nail axis $A_{14}$ and measuring the force required to separate the nail 14 from the plastic 12. The nails that were pre-heated prior to molding were heated to a temperature of about 500° F. to 550° F., after which the plastic was molded to the nails. For the post heat treatment, the nails were heated to the temperature shown for a period of about 30 minutes.

As can be seen from Table 1, the difference in plastic shear strength between the non-pre-heated nails and the preheated nails is quite significant. For the present maleic anhydride modified polypropylene, the difference is a factor of over 15 (71.0 lbs./4.6 lbs.) without post molding heat treatment. With post molding heat treatment, the shear strength increased by a factor of almost 3 over the non-post heat treated (pre-heated) nails. The plastic shear strength was shown to be about 71.0 lbs with pre-heating the nails prior to molding the plastic to the nails. In no case did a cold-applied plastic approach the shear strength of the pre-heated nail strips.

It was observed that nails strips formed in accordance with the present invention exhibited a very limited amount of debris compared to known plastic collations, principally because the plastic remained on the nail shank and penetrated the substrate (wood) with the nail. Moreover, it was found that the debris that was generated was in the form of a finer material (smaller sized particles) so there was less of a housekeeping issue with the debris that was generated.

Debris was collected from samples of nails to determine the "debris performance" or reduction of debris generation of the present collation system. The amount of loose debris was measured by first weighing a given collated nail strip consisting of 10 nails. The starting weight of plastic was calculated by subtracting the weight of 10 uncollated nails from this amount. The test nail strip was then fired into a substrate (e.g., wood board) surrounded by an enclosure to facilitate the capture and collection of the loose debris. The collected loose debris was then weighed and divided by the original starting plastic amount to yield the percent loose debris for a particular plastic collation material.

Table 2, below, summarizes the results obtained with selected three of collating plastic materials (a non-adhesive polypropylene material, an adhesive material in accordance with the present invention that was formulated as a blend of 50 percent by weight polypropylene and 50 percent by weight of the maleic anhydride modified polypropylene, and a formulation of 100 percent of the maleic anhydride modified polypropylene). Firing tests were conducted in both pine and medium density fibreboard (MDF) substrates.

TABLE 2

DEBRIS GENERATED FROM VARIOUS PLASTIC NAIL COLLATIONS

| Plastic collating material | % Loose Debris (Pine) | % Loose Debris (MDF) |
|---|---|---|
| Non-adhesive polypropylene | 86 | 91 |
| Polypropylene/maleic anhydride modified polypropylene blend (50%/50% by weight) | 17 | 14 |
| 100% maleic anhydride modified polypropylene, | 0 | 0 |

It was also found that the nails carried the plastic into the wood and that the plastic was embedded in the wood with the nail. In fact, surprisingly, this increased the nails' holding power in the wood. It is believed that this was due to the adhesive nature of the plastic as it embedded in the wood, in conjunction with the adhesion of the plastic to the nail. That is, it is believed that the plastic (adhesive) flowed into the wood structure and bonded with the wood structure, thus providing even greater holding power.

Table 3 below shows the results of evaluations that were conducted to compare the holding power or withdrawal strength of nails that were "fired" into wood from nail strips in accordance with the present invention to non-pre-heated polypropylene or control molded nail strip collations. The withdrawal strengths were measured as the force (in lbs/in of withdrawal) required to pull the nail from the wood. The values were normalized (e.g. calculated per inch of withdrawal) by dividing the force by the penetration depth.

TABLE 3

PENETRATION AND WITHDRAWAL STRENGTH OF NAILS CARRIED IN VARIOUS PLASTIC NAIL COLLATIONS

| Sample No. | Standing Ht. (in) | Penetration (in) | Ultimate (lbs) | Withdrawal Strength (lbs./in. of withdrawal) | Plastic Collation Material |
|---|---|---|---|---|---|
| 1 | 0.258 | 2.432 | 408.73 | 168.06 | Tymor ™ |
| 2 | 0.585 | 2.415 | 372.28 | 154.14 | Tymor ™ |
| 3 | 0.618 | 2.382 | 150.06 | 63.00 | Control |
| 4 | 0.616 | 2.384 | 150.93 | 63.31 | Control |
| 5 | 0.621 | 2.379 | 231.86 | 97.46 | Admer ® |
| 6 | 0.644 | 2.356 | 127.87 | 54.27 | Control |

As can be seen from the data of Table 3, nail strips in accordance with the present invention exhibited considerably higher withdrawal strengths compared to non-adhered (control) nails. The control nails exhibited withdrawal strengths of about 54.3 to 63.3 lbs, whereas the preheated nails exhibited withdrawal strengths of about 97.5 to 168.1 lbs. In each case, the pre-heated nails required almost 54 percent greater force to withdraw or pull out the nails. At the same time, the nail penetration was essentially equal to that of the non-preheated nails. The Admer® and Tymor™ materials are both maleic anhydride modified polypropylene.

In the present nail strips 10, the plastic is a uniform material that is molded over the nail shanks 16 and between the nails 14. It will be appreciated that the plastic material can be a multi-part molding, in which discrete layers in the molding (collating) material are provided on the nails. In such a system, an adhesive can be applied or bonded to the nails onto which a layer of a material with desired characteristics (e.g., a stiffer or more rigid material or a more impact resistant material) is applied. Alternately, of course, a layered configuration can be achieved using a coextrusion of two or more plastics.

Another aspect of the present nail strip 10 is the shape or configuration of the molding around and between the nails 14. That is, the shape of the collars 20 and the connecting portions 22. In a present strip 10, the collars 20 are formed as encircling elements that have a greater longitudinal or axial length at about a midpoint $L_{20M}$ between the connecting elements 22 (that is at about the midpoint of the circle inscribed by the nail), and dip to a smaller axial length at about the connecting portions $L_{20C}$.

Figure 2:
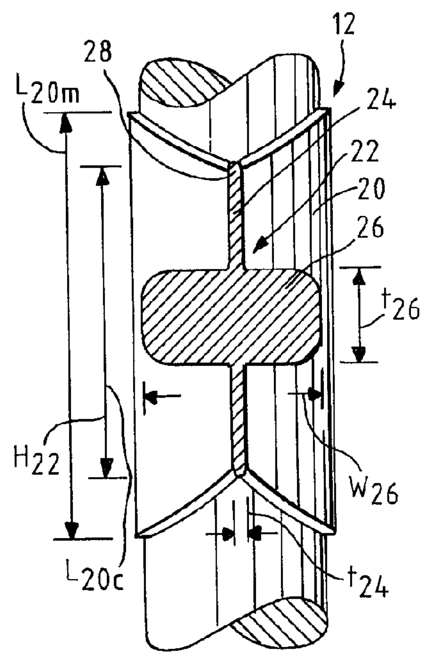
FIG. 2 is a cross-sectional view taken along line 2-2 of FIG. 1.
Figure 3:
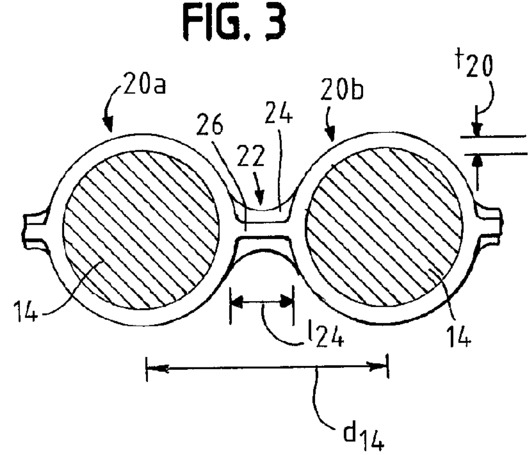
FIG. 3 is a cross-sectional view taken along line 3-3 of FIG. 1.

The connecting portions 22 include a bridge 24 that extends from one collar **20*a* to the adjacent collar 20*b* and is about the height $H_{22}$ of the collar 20 at the collar 20/connecting portion 22 juncture. The bridge 24 is a relatively long, thin element that in fact "bridges" the two adjacent collars 20*a*, 20*b*. A rib 26 runs along the bridge 24 from one collar 20*a* to the next 20_b_. The rib 26 is a cross-piece to the bridge 24 and has a low profile (e.g., is short) in the nail axial direction or along the length of the nail (i.e., has a low thickness $t_{26}$), but has a greater depth or width $w_{26}$ than the bridge 24. As seen in FIGS. 2 and 3, the cross-section of the bridge 24 and rib 26 is cruciform-shaped, and with the 26 rib serving as the cross-piece, the rib 26 resides at about the middle of the bridge 24. A cross-section taken through the nails 14 (see, FIG. 3) that provides a top or bottom view of the connecting portion 22 shows that the rib 26 actually has a concave shape as it extends between the nails 14. Both the bridge 24 and the rib 26 are formed having rounded ends, as indicated at 28**.

As will be appreciated by those skilled in the art, when a nail 14 is driven from the strip 10, it is the nail 14, the collar 20 and the connecting portion 22 between the driven nail 14 and the next adjacent nail 14_b_ (see right-hand side of FIG. 1) that are separated from the strip 10. Desirably, this entire "assembly" is driven into the substrate, and it will be understood that it is desirable to drive as much of the assembly as possible into the wood to, among other things, reduce the amount of debris that is generated.

To effect separation of the connecting portion 22, a notch 30 can be formed at the base or bottom 32 of the connecting portion 22 along a desired line of separation, or at the juncture of the connecting portion and the next adjacent nail. This provides a location at which the nail 14, collar 20 and connecting portion 22, as a unit, separate from the strip 10.

The connecting portion 22 provides the necessary rigidity to the strip 10 that, in conjunction with the adhesive characteristics of the plastic, prevents corrugation of the strip 10. Nevertheless, even with the increased adhesion and rigidity, that no significant increase in force is needed to drive the nail 14 and separate the nail 14 from the strip 10.

In a present nail strip 10, the upper and lower collations 12_a,b_ have essentially equal dimensions. The collar 20 has a length $L_{20M}$, $L_{20C}$ of about 0.360 inches to 0.480 inches and a thickness $t_{20}$ of about 0.005 inches to 0.015. The bridge 24 has a length $I_{24}$ of about 0.280 inches to 0.420 inches and a thickness $t_{24}$ of about 0.006 inches to 0.014 inches and the rib 26 has a thickness $t_{26}$ of about 0.045 inches to 0.060 inches and a width $w_{26}$ of about 0.087 inches to 0.128 inches. It will be appreciated that because the rib 26 has a concave shape, the width $w_{26}$ varies along the length of the rib 26.

Figure 4:
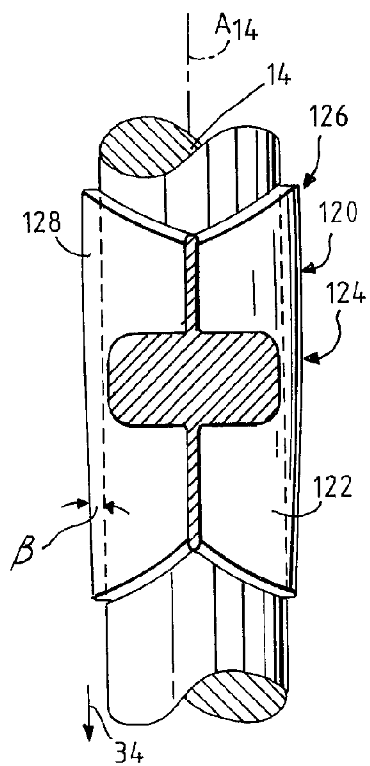
FIG. 4 is an illustration similar to FIG. 2, showing a tapered collar.

Referring to FIG. 4, the collar 120 can be formed having a taper or a thinned region 122 at the collar portion 124 closest to the tip 34 of the nail 14 or at the leading end of the collar 120. The collar 120 expands or thickens toward the trailing end 126. It has been observed that this taper 122 facilitates penetration of the nail 14 and plastic collar portion 120 into the wood. The taper 122 is preferably formed at an angle β relative to the longitudinal axis $A_{14}$ of the nail 14, of about 0.5 degree to about 5.0 degrees, and most preferably about 1.0 degrees. The taper 122 forms a wedge 128 that assists penetration of the nail 14 into the substrate and can further enhance the withdrawal resistance. It should, however, be recognized that the angle β cannot be too great in that the wedge 128 could serve to split the wood.

It has also been observed that the location of the collar 20 on the shank 16 contributes to increasing the penetration of the nail 14 into the wood. Specifically, it has been found that positioning the collar 20 closer to the tip 34 of the nail 14 results in increased nail penetration. It is believed that because the collar 20 (which is an interference to penetration) is positioned closer to the nail tip 34, the greatest interference (that is as the collar 20 is entering the wood) is encountered while the impulse from the nail driving tool is high. Accordingly, the greatest resistance to penetration is overcome while the impulse from the tool is high, and, as such, penetration of the nail is greater when the collar 20 is positioned close to the nail tip 34 rather than farther back on the nail shank 16, near to the nail head H.

An evaluation of the effect of the collar 20 position on the shank 16 was conducted. Using a nail 14 that was 3 inches long and 0.131 nominal diameter, with a collar length $L_{20M}$ of 0.5 inches and a thickness $t_{20}$ of about 0.020 inches and a collation material of maleic anhydride modified polypropylene (Admer®) and a pneumatic driving force of 90 psi, it was found that a nail 14 having a collar 20 positioned 2.25 inches from the tip 34 was driven (had a penetration of) 2.45 inches, a nail 14 having a collar 20 positioned 1.5 inches from the tip 34 was driven 2.75 inches, a nail 14 having a collar 20 positioned 0.5 inches from the tip 34 was driven 2.975 inches, and a bare nail 14 was driven 2.925 inches It will be appreciated by those skilled in the art that the use of a forward positioned collar 20 (or more generally a forwardly positioned collation element or support) is not limited to use with a collated nail strip 10. Rather, such an arrangement can be used with other strip formed fasteners and other strip-formed consumables.

Figure 5A:
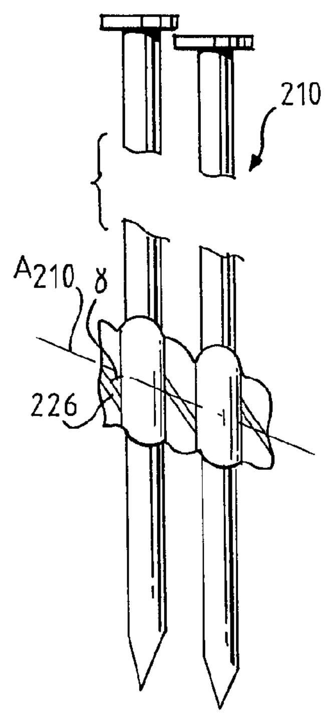
FIGS. 5A and 5B illustrate portions of strips having angled ribs.
Figure 5B:
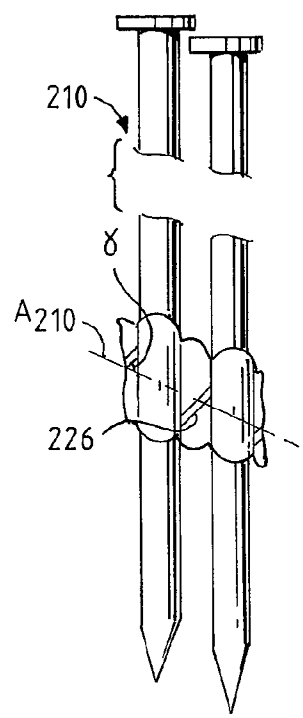

FIGS. 5A and 5B illustrate an embodiment 210 in which the ribs 226 are formed at an angle γ and γ' relative to an axis $A_{210}$ of the strip 10 (as opposed to the ribs 26 in the embodiment of FIG. 1 which are generally parallel to the axis $A_{10}$).

Figure 6:
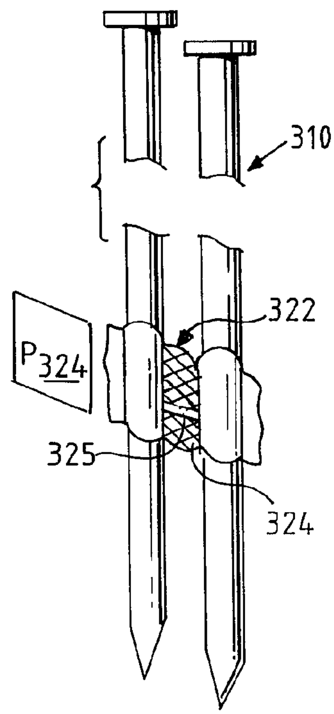
Figure 6A:
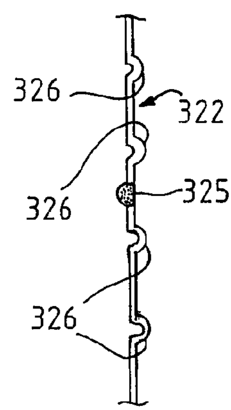

FIGS. 6 and 6A illustrate an alternate embodiment of the plastic nail collation 310 in which an embossed pattern 324 is formed in the connecting portion 322 of the strip 310, rather than the bridge 24 and rib 26 configuration (of FIGS. 1-5). In the embossed pattern 324 embodiment, a pattern of ribs 326 is formed in the connecting portion 322 that can extend in one or both directions relative to a plane $P_{322}$ that is defined by the connecting 322 portion extending between the collars 320 (e.g., into or out of or both into and out of the plane $P_{322}$ defined by the connecting portion 322 and the adjacent nails 14_a,b_). A cross-section of a one-directional embossing 324 is illustrated in FIG. 6A. The embossing 324 serves to provide a three-dimensional structure, much like the bridges 24 and ribs 26, to enhance the rigidity of the strip 310. In addition, it is anticipated that the embossing 324 can provide the necessary rigidity and predictability in separation while at the same time, reducing the amount of material needed to form the strip 310. A rib 325 can be used with the embossed collation embodiment 310, as well. The embossing can also be formed in the collar. It will be appreciated by those skilled in the art from a review of the drawings that the present collation can be used with coiled nails (e.g., a roller nail strip) as well. In such an arrangement, the collation is formed with a bridge connecting the collar portions, however, a reinforcing or stiffening element (e.g., rib) is not used so that the strip can be coiled.

All patents referred to herein, are incorporated herein by reference, whether or not specifically done so within the text of this disclosure. In the present disclosure, the words "a" or "an" are to be taken to include both the singular and the plural. Conversely, any reference to plural items shall, where appropriate, include the singular.

From the foregoing it will be observed that numerous modifications and variations can be effectuated without departing from the true spirit and scope of the novel concepts of the present invention. It is to be understood that no limitation with respect to the specific embodiments illustrated is intended or should be inferred. The disclosure is intended to cover by the appended claims all such modifications as fall within the scope of the claims.

What is claimed is:

1. A method for making a tape-less fastener assembly comprising the steps of:

arranging a plurality of fasteners in a row parallel to one another, each of the fasteners having a longitudinal axis;

preheating the plurality of fasteners to elevate the temperature of the fasteners;

molding a polymer material onto the preheated fasteners and between adjacent fasteners to form a first plastic molding having a collar fully encircling a shank of each fastener and a connecting portion between adjacent fasteners and molding a polymer material onto the heated fasteners and between adjacent fasteners to form a second plastic molding having a collar fully encircling the shank of each fastener and a connecting portion extending between the collar portions of adjacent fasteners, one of first and second plastic moldings being an upper plastic molding and the other being a lower plastic molding, the connecting portions extending parallel to and coplanar with a plane defined by the longitudinal axes of the fasteners; and cooling the strip to form the fastener assembly, wherein in the molding and cooling steps, the plastic molding adheres to the fasteners such that when a fastener is driven into a substrate, debris generated from driving the fastener generates less than about 50 percent of the debris generated by driving a non-pre-heated fastener into the substrate from a like assembly, and wherein the collar portion encircling the shank and substantially the entire connecting portion extending from the collar portion to about the next subsequent collar portion penetrates the substrate with the fastener.

2. The method in accordance with claim 1 wherein the polymer is a modified polypropylene.

3. The method in accordance with claim 2 wherein the polypropylene is a maleic anhydride modified polypropylene.

4. The method in accordance with claim 1 wherein the connecting portion is formed having a bridge and a rib.

5. The method in accordance with claim 4 wherein the bridge and rib have a generally cruciform shape.

6. The method in accordance with claim 1 wherein the fasteners are preheated to a temperature of at least about 450° F.

7. The method in accordance with claim 6 wherein the fasteners are preheated to a temperature of about 450° F. to 600° F.

8. The method in accordance with claim 1 wherein the polymer is a modified polyethylene.

9. The method in accordance with claim 8 wherein the polyethylene is a maleic anhydride modified polyethylene.

10. The method in accordance with claim 1 including the step of forming a desired location of separation between adjacent fasteners on the strip.

11. The method in accordance with claim 1 wherein the step of arranging the plurality of fasteners includes the step of staggering each fastener from each adjacent fastener to form an angle between each fastener and the strip.

12. The method in accordance with claim 11 wherein the angle is greater than zero.

13. The method in accordance with claim 12 wherein the angle is between about 20 degrees and about 30 degrees.

14. The method in accordance with claim 13 wherein the angle is about 20 degrees.

15. The method in accordance with claim 1 wherein the debris generated is less than about 25 percent of the debris generated by driving a non-pre-heated fastener into the substrate from a like assembly.

16. A method for making a tape-less fastener assembly comprising the steps of:

arranging a plurality of fasteners in a row parallel to one another;

preheating the plurality of fasteners to elevate the temperature of the fasteners;

molding a polymer material onto the preheated fasteners and between adjacent fasteners to form a plastic molding having a collar encircling a shank of each fastener and a connecting portion between adjacent fasteners;

cooling the strip to form the fastener assembly; and post molding heat treating the fastener assembly.

* * * * *

UNITED STATES PATENT AND TRADEMARK OFFICE

CERTIFICATE OF CORRECTION

PATENT NO. : 7,788,787 B2
APPLICATION NO. : 12/176722
DATED : September 7, 2010
INVENTOR(S) : Lawrence S. Shelton et al.

It is certified that error appears in the above-identified patent and that said Letters Patent is hereby corrected as shown below:

Column 7, Line 38: The reference identifier “$I_{24}$” should be deleted and replaced with the reference identifier “$l_{24}$”.

Column 8, Line 56: A new paragraph should begin following the “.” found after the first occurrence of the word “disclosure”.

Signed and Sealed this

Sixteenth Day of November, 2010

David J. Kappos
*Director of the United States Patent and Trademark Office*